United States Patent
Kolari

(10) Patent No.: US 7,194,822 B2
(45) Date of Patent: Mar. 27, 2007

(54) SYSTEMS FOR DRYING MOISTURE-CONTAINING WORK PIECES AND METHODS FOR DRYING SAME

(75) Inventor: Gary L. Kolari, Portland, OR (US)

(73) Assignee: American Wood Dryers, Inc., Clackamas, OR (US)

( * ) Notice: Subject to any disclaimer, the term of this patent is extended or adjusted under 35 U.S.C. 154(b) by 0 days.

(21) Appl. No.: 10/843,728

(22) Filed: May 11, 2004

(65) Prior Publication Data

US 2005/0252027 A1 Nov. 17, 2005

(51) Int. Cl.
F26B 21/00 (2006.01)
F26B 21/06 (2006.01)
F26B 21/08 (2006.01)

(52) U.S. Cl. .............. 34/489; 34/491; 34/492; 34/514; 34/565; 34/566; 34/86; 34/191

(58) Field of Classification Search .......... 34/487, 34/488, 489, 491, 492, 514, 515, 565, 566, 34/569, 86, 191, 212, 215, 218, 219; 165/59, 165/240; 236/44 C See application file for complete search history.

(56) References Cited

U.S. PATENT DOCUMENTS

| | | | |
|---|---|---|---|
| 3,991,819 A | * | 11/1976 | Clark ..................... 165/59 |
| 4,662,083 A | * | 5/1987 | Carter et al. ............. 34/86 |
| 5,893,218 A | * | 4/1999 | Hunter et al. ............. 34/492 |
| 6,360,550 B2 | * | 3/2002 | Klapp et al. ............. 236/44 C |
| 6,450,414 B1 | * | 9/2002 | Dartnall et al. ............ 237/2 A |
| 2004/0187341 A1 | * | 9/2004 | Studd et al. .............. 34/402 |

* cited by examiner

Primary Examiner—Jiping Lu
(74) Attorney, Agent, or Firm—Marger, Johnson & McCollom, PC

(57) ABSTRACT

A system and method are provided for controllably drying moisture-containing work pieces. The system comprises a drying compartment defining an internal workspace for housing and drying the moisture-containing work pieces by introducing heat into the internal workspace and heating the moisture-containing work pieces located in the internal workspace by removing heated moisture from the work pieces and absorbing the heated moisture into the air in the workspace to produce heated humidified air. A multi-directional air flow heat exchanger is employed for receiving heated humidified air and atmospheric air and for recycling waste heat from exhaust air from the drying compartment, and for heating the atmospheric air in the heat exchanger using recovered heat extracted from the heated humidified air to a temperature higher than ambient temperature thereby reducing energy costs and drying time and preventing the loss of circulation air. First and second reversible variable speed fans are also included in the system. Each of the fans is independently controllable at respective intake and exhaust modes and at variable air flow rates, without employing a damper for controlling the flow of exhaust air and atmospheric air to and from the heat exchanger.

24 Claims, 1 Drawing Sheet

SYSTEMS FOR DRYING MOISTURE-CONTAINING WORK PIECES AND METHODS FOR DRYING SAME

BACKGROUND OF THE INVENTION

The present invention relates generally to systems for drying of moisture-containing work pieces, such as lumber or the like, and to methods for drying same, particularly, to ventilation systems and methods for drying the work pieces, and more particularly, to ventilation systems used in conjunction with kilns and methods for drying work pieces such as lumber.

Drying of moisture-containing work pieces, such as lumber, is known. For example, during the kiln drying process of lumber, heat is injected into the internal workspace of the kiln to remove a substantial amount of moisture from the lumber located therein. The moisture removal rate from the lumber is controlled by setting the kiln dry bulb and the corresponding kiln wet bulb temperatures at specified values. These temperatures are determined by the drying schedule selected by the kiln operator. As the lumber dries, moisture is absorbed into the kiln atmosphere which in turn raises the wet bulb temperature.

A wet bulb controller is provided to maintain the wet bulb temperature at a steady level by opening vents located on the kiln. This releases humidified air from the kiln. The humidity is replaced with fresh external atmospheric air that is at a lower temperature and contains less moisture. A substantial portion of the internal atmosphere inside the kiln is transferred out of the exhaust vents, and the fresh air is drawn into the intake vents by the main kiln air recirculation system.

All of the air that is drawn into the kiln has to be reheated to the operating kiln temperature. This is accomplished using the dry bulb controller. The dry bulb controller will act to maintain steady state operating conditions within the kiln workspace by opening a heat control mechanism which injects heat into the kiln as determined by the operator. This injected heat will cause the lumber to release additional moisture. Then, the venting/heating cycle will be repeated as required.

U.S. Pat. No. 5,018,281 discloses a heat exchanger system for a tobacco curing and drying barn 10 that is designed to utilize the heat associated with exhaust air leaving the barn to heat fresh incoming air. A top mounted heat exchanger 50 includes a pair of laterally spaced counterflow heat exchanger modules 52, 54 connected to the barn and to a fresh air duct 74 that leads back into the during and drying structure.

U.S. Pat. No. 5,195,251 discloses a drying kiln including a drying chamber, a heating system for heating air to be delivered to the drying chamber, and a ducting system for delivering heated air to the drying chamber. Fans are provided for establishing a low air pressure region and a high air pressure region adjacent the ducting system for generating a circulation flow of air throughout the drying chamber.

In U.S. Pat. No. 4,662,083, first and second ported ducts are associated with a drying chamber. A flow control housing has first and second compartments communicating respectively with the first and second ducts. These compartments also have openings which communicate with atmosphere. A fan is employed which draws air from the drying chamber into one of the ducts and through one of the compartments to atmosphere. At the same time a fan on a common shaft draws in make-up air from the atmosphere and forces it through the other of the compartments and into the other duct for discharge into the dryer. The fans are reversible, and the flow control housing is combined with a double acting heat exchanger which extracts heat from exhaust air in one compartment and transfers it to the other compartment for preheating make-up air. Since the fans are on a common shaft they cannot act independently but instead are selectively driven in one direction or the other. More specifically, when the fan journal spins in a first direction, the fan 58 acts as an intake fan and the fan 60 acts as an exhaust fan. When the journal direction is reversed, the fan 58 acts as an exhaust fan and the fan 60 acts as an intake fan. This precludes allowing the two fans to operate in either a full exhaust mode or a full intake mode. A damper is provided in the flow control housing on the atmosphere side thereof for precise control of exhaust and make-up air. The fan speed variability and the flow are specifically controlled by adjustment of the damper.

SUMMARY OF THE INVENTION

The air that is released from the kiln during the above-described venting/heating cycle is hot and moist and contains heat energy. It has now been determined that this heat energy can be recycled back into the dry kiln.

Thus, the system of the present invention has been designed to extract waste exhaust heat from a kiln ventilation system. The waste heat is then returned back into the fresh air intake, reusing this heat to augment the existing heat system in the kiln.

A method is also provided of controlling the system of this invention to have it operate in a way that the kiln will only ventilate the amount of humidified air required to maintain the system at steady state operating conditions. This can be accomplished by conducting dry kiln operation at any level from 0 to 100% of the required output, and being able to sustain the dry kiln operation at that predetermined output level.

Unlike U.S. Pat. No. 4,662,083, the subject system describes independently controlled intake/exhaust fans in which the speed of each fan can be independently varied to correct pressure imbalances in the kiln. For example, imbalances in the kiln can be corrected by having the speed of the intake fans to run at a different speed than the exhaust fans. Also, the fan speeds can be varied in the system of the present invention to either increase or decrease the amount of venting required. This fan speed variability allows for much finer and therefore much more efficient operation. The system of this invention can also include various temperature sensors that measure cool outside air temperature, temperature of that air entering the heat exchanger, temperature of air entering the heat exchanger from the building and temperature of the air as it leaves the heat exchanger. All of this information is used by the controller to adjust the fan speed and direction which achieves efficient operation of the kiln.

The subject system has a unique reversible heat exchanger that is designed to allow the air flow through the heat exchanger to switch directions based on a predetermined dry kiln air flow direction. This heat exchanger preferably has independent air flow channels that allow the hot moist air flow to pass on one side of a transfer surface and for the cool dry air flow to pass on the other side of the surface. Typically, each respective air flow can be heated without mixing. When the airflow in the dry kiln is reversed, the airflow through the heat exchanger channels is preferably also reversed. Reversible fans can be employed that have substantially the same airflow characteristics in both directions control the airflow through the heat exchanger. By reversing the airflow through the heat exchanger, any auxiliary equipment, such as ducting or the like, that would be required to deliver the air to the kiln can be avoided. Furthermore, the use of switching dampers that are required to be synchronized with the airflow in a conventional dry kiln can be eliminated.

During the venting process, a dry kiln will have a variable amount of venting that is required depending on factors such as the type of lumber being dried, the moisture content of the lumber, the time of year, and the drying schedule used. Variable frequency drives are preferably interfaced with the humidity control system to set the speed of the vent/heat recovery fans. This is achieved by proportionately increasing or decreasing speed of these fans. This in turn will increase or decrease the air flow through the device. The intake and exhaust fans run at speeds which preserve a balanced pressure inside of the workspace. Typically, the intake and exhaust fans run at different speeds. The speed of each fan is preferably determined by the venting control system.

The system of the present invention generally has multiple modes of operation. For example, in one preferred approach, normal power venting/heat exchanger mode where one fan blows in and one fan blows out. In another preferred mode, full exhaust is provided to evacuate all ambient air where both fans blow out. Alternatively, it is preferred that full intake for emergency cooling be employed where both fans blow in.

The power vent heat exchanger system is preferably located on top of the dry kiln over the main kiln circulation fans. This eliminates the need for distribution ducting inside of the dry kiln. Each dry kiln can preferably have one or more of these systems depending on the capacity of the venting requirements.

The power venting and heat recovery system of the dry kiln is designed to significantly reduce the energy cost by providing optimal kiln heat recovery. The system extracts heat out of the hot moist air that is exhausted from the kiln during the venting process. The heat is then added back into the cool dry air that is introduced back into the dry kiln during this venting process. It also reduces drying time by preventing the loss of circulation air. This ensures consistent air velocity through the lumber load during heavy venting for greater product uniformity.

Thus, a system is provided for controllably drying moisture-containing work pieces. The system comprises a drying compartment defining an internal workspace for housing and drying the moisture-containing work pieces by introducing heat into the internal workspace. The moisture-containing work pieces located in the internal workspace are heated by removing heated moisture from the work pieces and absorbing the heated moisture into the air in the workspace to produce heated humidified air.

A multi-directional air flow heat exchanger is employed for (a) receiving heated humidified air and atmospheric air, and (b) for recycling waste heat from exhaust air from the drying compartment, and (c) for heating the atmospheric air in the heat exchanger using recovered heat extracted from the heated humidified air to a temperature higher than ambient temperature. In this way, energy costs and drying time are reduced, and the loss of circulation air is prevented. The heat exchanger preferably has first and second air flow channels that allow hot moist air flow to pass on a first side of a transfer surface and for the cool dry air flow to pass on a second side of the transfer surface.

First and second reversible variable speed fans are also provided. Each of the fans is independently controllable at respective intake and exhaust modes, and at variable air flow rates, without employing a damper for controlling the flow of exhaust air and atmospheric air to and from heat exchanger. The first variable speed fan and/or the second variable speed fan (a) controllably exhaust the heated humidified air from the drying compartment into the heat exchanger, (b) introduce atmospheric air at ambient temperature into the heat exchanger, (c) controllably exhaust the heated humidified air from the heat exchanger after heating the atmospheric air, and (d) replace the humidified air transferred from the drying compartment with the heated atmospheric air. The first and second reversible variable speed fans are preferably operable at varying speeds to maintain a pressure balance in the workspace.

The first and second reversible variable speed fans can also preferably be operable at varying speeds to control the flow of air into and out of the workspace using a programmable controller. Preferably, the programmable controller is a programmable logic controller.

The first and second reversible variable speed fans can preferably be operable at varying speeds to control the flow of air into and out of the workspace based on (a) the temperature of the atmospheric air, and/or (b) the temperature in the workspace, and/or (c) the humidity in the workspace, and/or (d) the temperature of the atmospheric air before and/or after the heat exchanger, and/or (e) the temperature of exhaust air before and/or after the heat exchanger. The first and second reversible variable speed fans can also preferably be operable at varying speeds to control the flow of air into and out of the workspace based on the temperature of atmospheric air entering the area surrounding the high moisture-containing work pieces and/or the temperature of the exhaust air exiting the area surrounding the high moisture-containing work pieces and/or the relative humidity in the workspace.

In the system of present invention, the first and second reversible variable speed fans preferably can have substantially the same air flow characteristics in each direction for controlling air flow through the heat exchanger. Moreover, the first and second reversible variable speed fans can preferably be reversible air foil fans.

The system is preferably formed without auxiliary elongate conduits or ducts for transporting the flow of atmospheric air to the drying compartment.

DETAILED DESCRIPTION OF A PREFERRED EMBODIMENT

Figure 1:
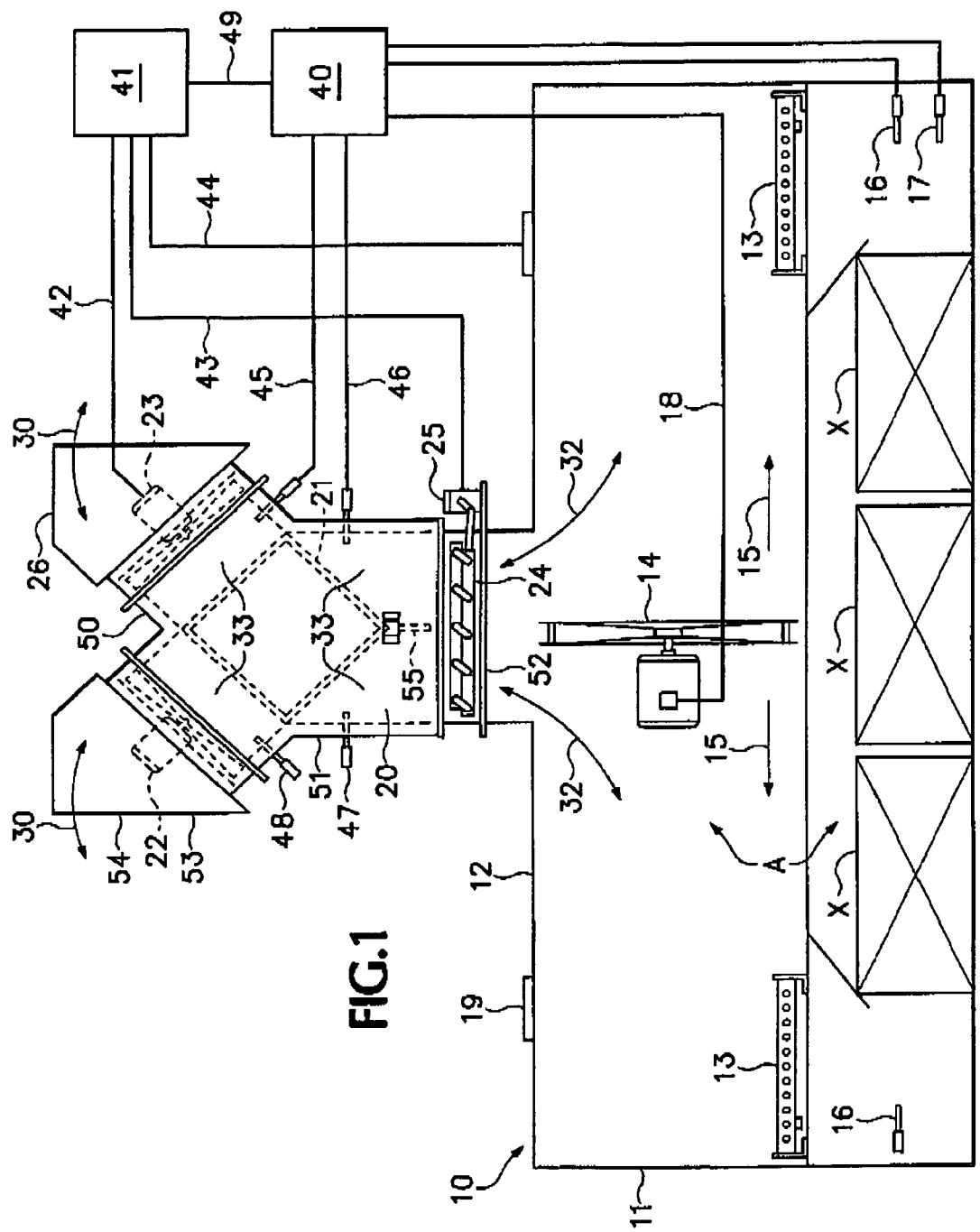
FIG. 1 is a diagrammatic representation of a preferred system of the present invention.

Referring now to FIG. 1, a diagrammatic representation of a system 1 is provided which is employed in combination with a building 10, having enclosing walls 11 and roof 12, for controllably drying moisture-containing work pieces "X". System 1 is typically a power venting heat recovery system 20 and the associated programmable controller system 41, which is preferably a programmable logic controller system. System 1 can be a ThermoVent System manufactured by American Wood Dryers, Inc. of Clackamas, Oreg.

Work pieces "X" are typically lumber which is dried employing heating system 13, which is typically a conventional kiln heating system. Heating system 13 is located within the building 10 and is in communication inline with an air circulation system 14, which is typically a conventional kiln dryer circulation system. Air circulation system 14 is designed to move air over the work pieces X located in a workspace "A" in the building 10. The air circulation system 14 can reverse the flow of air 15, and can change the direction that the air engages the work pieces X. Ventilators 19, located on the roof or walls, exhaust warm moist air or draw in cool dry air. Dry bulbs 16 and wet bulbs 17 are located in the building 10 to measure the conditions in the workspace A. These conditions are monitored by a temperature and humidity control system 40. The control system 40 will adjust the operation of the heat system 13 and the ventilators 19, respectively, to maintain the desired conditions in the building 10.

The power venting heat recovery system 20 for the system 1 is located above, and preferably substantially on the center line of the circulation system 14. Power venting heat recovery system 20 is attached securely to the building 10 but can be combined with other types of drying or building structures. The power venting heat recovery system 20 comprises an air-to-air heat exchanger 21 with a top 50 and sidewalls 51. Top inlet and outlet openings 54 and a bottom opening 52, respectively, allow air to be moved into and out of the building 10. Vent/Heat recovery fans 22 and 23 are located between the top openings 54 and the heat exchanger 21. At the bottom outlet 52 of the power venting heat recovery system 20 is an airflow diverter 24 that is operated by an actuator 25 which opens and closes the airflow diverter 24. The open or closed positioning of the airflow diverter 24 depends on the stage of moisture removal in the workspace A. Rain hoods 26 and guards 53 are located over and, are used to cover, the vent/heat recovery fans 23 and the air flow intake/exhaust 30 as the air enters or is exhausted from the venting/heat recovery system housing 20.

Cool air 30 from the power fans 33 moves through a first portion of the heat exchanger 21 and past a first portion of an air flow divider 55 through a first portion of the airflow diverter 24 and into the building 10. Hot moist air 32 is drawn by the vent/heat recovery fans 22 and 23 from the building 10 through a second portion of the airflow diverter 24, and through a second portion of the heat exchanger 21. The air is exhausted out the rain hood 26.

When the building circulation fans 14 are reversed during the drying process, the vent/heat recovery fans 22 and 23 are synchronized to be reversed at the same time. The cool air will now enter one side of the workspace A and the hot moist air will exhaust on the left side of the workspace A. During the drying process, the programmable control system 40 will send a signal 49 to the ventilation controller to either increase or decrease the amount of venting required.

The vent control panel 41 has variable frequency drives that controls the speed (RPM) of the vent/heat recovery fans 22 and 23 in proportion to the output signal of the controller 40. The controller 40 has temperature sensors 48 to measure the cool outside temperature. Sensor 46 measures the temperature as the air is heated by the heat exchanger 21. Sensor 47 measures the temperature from the building as it enters the heat exchanger 21. Sensor 45 measures the temperature as the air leaves the heat exchanger 21. By determining the speed of the vent/heat recovery fans 22 and 23, and the temperature increase from sensor 48 to sensor 46, the amount of energy saved can be calculated and graphically presented by the control system 40.

When using the vent/heat recovery fans 22 and 23 to exhaust hot moist air 30 from the building 10 and to draw cool dry air into the building 10, respectively, a pressure imbalance occurs if the vent/heat recovery fans 22 and 23 both operate at the same speed. This imbalance is corrected by having the intake fans run at a lower speed than the exhaust fans. These corrected values are set by the controller 41.

During the drying cycle, or when the kiln is not operating, the power vent heat recovery system 20 can be operated at three different modes of operation. The first mode of operation is as described above. The second mode of operation is where the system can be switched to have both vent/heat recovery fans 22 and 23 blow air into the building 10 without using the heat exchanger 21. Instead cool air 30 only is introduced into the building. The third option is to set both vent/heat recovery fans 22 and 23 to an exhaust mode to remove heat from the building 10.

During the drying process, if the power venting heat recovery system 20 cannot meet the demand to vent enough moisture from the building 10, the vent control 41 can be set to use the standard vents 19 as an auxiliary to provide additional venting during periods of high demand.

The invention claimed is:

1. A method for controlling drying conditions in a dry kiln including a workspace by venting and recycling waste heat from exhaust air from the workspace, said workspace housing and drying high moisture-containing work pieces, which comprises:

introducing heat into said workspace;

heating the high moisture-containing work pieces located in said workspace;

removing heated moisture from the high moisture-containing work pieces and absorbing said heated moisture into the air in the workspace to produce heated humidified air thereby forming working pieces which are substantially uniformly dried;

providing a multi-directional air flow heat exchanger for receiving heated humidified air and atmospheric air;

providing first and second reversible variable speed fans, each of said fans being independently controllable at either one of an intake and exhaust mode and at variable air flow rates, without employing a damper for controlling the flow of exhaust air and atmospheric air to and from said heat exchanger;

providing a humidity control system including sensors for monitoring the conditions in the workspace, including air temperature before and/or after the heat exchanger, and sending a control signal;

providing variable frequency drives interfaced with said humidity control system to set the speed of the first and second reversible variable speed fans which proportionately increase or decrease the speed of the first and second reversible variable speed fans to increase or decrease the air flow through the dry kiln in response to the control signal sent by said control system;

controllably exhausting said heated humidified air from the workspace into said heat exchanger using said first variable speed and/or said second variable speed fan;

supplying atmospheric air at ambient temperature into said heat exchanger using said first variable speed and/or said second variable speed fan;

heating the atmospheric air in the heat exchanger to a temperature higher than ambient temperature using recovered heat extracted from the heated humidified air thereby reducing energy costs and drying time and preventing the loss of circulation air;

controllably exhausting said heated humidified air, after heating the atmospheric air, from said heat exchanger using said first variable speed and/or said second variable speed fan to maintain the dry kiln at steady state operating conditions;

controllably correcting pressure imbalance in the workspace by running the fan at intake mode, and the fan at exhaust mode, at different respective speeds; and replacing the humidified air transferred from the workspace with the heated atmospheric air using said first variable speed and/or said second variable speed fan, the dry kiln operation being conducted at any level from 0 to 100% of required output to sustain the dry kiln operation at a predetermined output level for maintaining said steady state operating conditions.

2. The method of claim 1, wherein said first and second reversible variable speed fans are operated at varying speeds to control the flow of air into and out of the workspace using a programmable controller.

3. The method of claim 2, wherein said programmable controller is a programmable logic controller.

4. The method of claim 1, wherein said first and second reversible variable speed fans are operated at varying speeds to control the flow of air into and out of the workspace based on the temperature of the atmospheric air.

5. The method of claim 1, wherein said first and second reversible variable speed fans are operated at varying speeds to control the flow of air into and out of the workspace based on the temperature in the workspace.

6. The method of claim 1, wherein said first and second reversible variable speed fans are operated at varying speeds to control the flow of air into and out of the workspace based on the humidity in the workspace.

7. The method of claim 1, wherein said first and second reversible variable speed fans are operated at varying speeds to control the flow of air into and out of the workspace based on the temperature of the atmospheric air before and/or after the heat exchanger.

8. The method of claim 1, wherein said first and second reversible variable speed fans are operated at varying speeds to control the flow of air into and out of the workspace based on the temperature of exhaust air before and/or after the heat exchanger.

9. The method of claim 1, wherein said first and second reversible variable speed fans are operated at varying speeds to control the flow of air into and out of the workspace based on the temperature of atmospheric air entering the area surrounding the high moisture-containing work pieces and/or the temperature of the exhaust air exiting the area surrounding the high moisture-containing work pieces and/or the relative humidity in the workspace.

10. A dry kiln system for controllably drying moisture-containing work pieces, which comprises:

a drying compartment defining an internal workspace for housing and drying said moisture-containing work pieces by introducing heat into said internal workspace and heating the moisture-containing work pieces located in said internal workspace by removing heated moisture from the work pieces and absorbing said heated moisture into the air in the workspace to produce heated humidified air;

a multi-directional air flow heat exchanger for receiving heated humidified air and atmospheric air and for recycling waste heat from exhaust air from the drying compartment, and for heating the atmospheric air in the heat exchanger using recovered heat extracted from the heated humidified air to a temperature higher than ambient temperature thereby reducing energy costs and drying time and preventing the loss of circulation air; and first and second reversible variable speed fans, each of said fans being independently controllable at respective intake and exhaust modes and at variable air flow rates, without employing a damper for controlling the flow of exhaust air and atmospheric air to and from said heat exchanger; and a humidity control system including sensors for monitoring the conditions in the workspace, including air temperature before and/or after the heat exchanger. and sending a control signal;

variable frequency drives interfaced with said humidity control system to set the speed of the first and second reversible variable speed fans which proportionately increase or decrease the speed of the first and second reversible variable speed fans to increase or decrease the air flow through the dry kiln in response to the control signal sent by said control system, said first variable speed and/or said second variable speed fan controlled by said humidity control system and (a) controllably exhausting said heated humidified air from the drying compartment into said heat exchanger, (b) introducing atmospheric air at ambient temperature into said heat exchanger, (c) controllably exhausting said heated humidified air from said heat exchanger after heating the atmospheric air, (d) replacing the humidified air transferred from the drying compartment with the heated atmospheric air, and (e) controllably correcting pressure imbalance in the workspace by running the fan at intake mode, and the fan at exhaust mode, at different respective speeds, the drying operation being conducted at any level from 0 to 100% of required output to sustain the dry kiln operation at a predetermined output level for maintaining a steady state operating conditions.

11. The system of claim 10, wherein said first and second reversible variable speed fans are operable at varying speeds to control the flow of air into and out of the workspace using a programmable controller.

12. The system of claim 11, wherein said programmable controller is a programmable logic controller.

13. The system of claim 10, wherein said first and second reversible variable speed fans are operable at varying speeds to control the flow of air into and out of the workspace based on the temperature of the atmospheric air.

14. The system of claim 10, wherein said first and second reversible variable speed fans are operable at varying speeds to control the flow of air into and out of the workspace based on the temperature in the workspace.

15. The system of claim 10, wherein said first and second reversible variable speed fans are operable at varying speeds to control the flow of air into and out of the workspace based on the humidity in the workspace.

16. The system of claim 10, wherein said first and second reversible variable speed fans are operable at varying speeds to control the flow of air into and out of the workspace based on the temperature of the atmospheric air before and/or after the heat exchanger.

17. The system of claim 11, wherein said first and second reversible variable speed fans are operable at varying speeds to control the flow of air into and out of the workspace based on the temperature of exhaust air before and/or after the heat exchanger.

18. The system of claim 10, wherein said first and second reversible variable speed fans are operable at varying speeds to control the flow of air into and out of the workspace based on the temperature of atmospheric air entering the area surrounding the high moisture-containing work pieces and/or the temperature of the exhaust air exiting the area surrounding the high moisture-containing work pieces and/or the relative humidity in the workspace.

19. The system of claim 10, wherein the heat exchanger has first and second air flow channels that allow hot moist air flow to pass on a first side of a transfer surface and for the cool dry air flow to pass on a second side of the transfer surface.

20. The system of claim 10, wherein said first and second reversible variable speed fans have substantially the same air flow characteristics in each direction for controlling air flow through the heat exchanger.

21. The system of claim 10, wherein said first and second reversible variable speed fans are reversible air foil fan.

22. The system of claim 10, without auxiliary elongate conduits or ducts for transporting the flow of atmospheric air to said drying compartment.

23. The system of claim 10, wherein said first and second reversible variable speed fans are controlled at a predetermined speed for maintaining a predetermined moisture level in the workspace.

24. A method for controlling drying conditions in a kiln for drying wood by venting and recycling waste heat from exhaust air from the workspace defined by said kiln, which comprises providing a kiln including said workspace for housing and drying wood;

introducing wood into said workspace;

introducing heat into said workspace for drying said wood;

heating the wood located in said workspace;

removing heated moisture from the wood and absorbing said heated moisture into the air in the workspace to produce heated humidified air thereby forming wood which is substantially uniformly dried;

providing a multi-directional air flow heat exchanger for receiving heated humidified air and atmospheric air;

providing first and second reversible variable speed fans, each of said fans being independently controllable at either one of an intake and exhaust mode and at variable air flow rates, the first and second reversible variable speed fans being run at different speeds which preserves a balanced pressure inside the workspace, without employing a damper for controlling the flow of exhaust air and atmospheric air to and from said heat exchanger;

providing a humidity control system including sensors for monitoring the conditions in the workspace, including air temperature before and/or after the heat exchanger, and sending a control signal;

providing variable frequency drives interfaced with said humidity control system to set the speed of the first and second reversible variable speed fans which proportionately increase or decrease the speed of the first and second reversible variable speed fans to increase or decrease the air flow through the dry kiln in response to the control signal sent by said control system;

controllably exhausting said heated humidified air from the workspace into said heat exchanger using said first variable speed and/or said second variable speed fan;

supplying atmospheric air at ambient temperature into said heat exchanger using said first variable speed and/or said second variable speed fan;

heating the atmospheric air in the heat exchanger to a temperature higher than ambient temperature using recovered heat extracted from the heated humidified air thereby reducing energy costs and drying time and preventing the loss of circulation air;

controllably exhausting said heated humidified air, after heating the atmospheric air, from said heat exchanger using said first variable speed and/or said second variable speed fan;

controllably correcting pressure imbalance in the workspace by running the fan at intake mode, and the fan at exhaust mode, at different respective speeds; and replacing the humidified air transferred from the workspace with the heated atmospheric air using said first variable speed and/or said second variable speed fan, the dry kiln operation being conducted at any level from 0 to 100% of required output to sustain the dry kiln operation at a predetermined output level for maintaining steady state operating conditions.

* * * * *

UNITED STATES PATENT AND TRADEMARK OFFICE
CERTIFICATE OF CORRECTION

PATENT NO. : 7,194,822 B2 Page 1 of 1
APPLICATION NO. : 10/843728
DATED : March 27, 2007
INVENTOR(S) : Gary L. Kolari It is certified that error appears in the above-identified patent and that said Letters Patent is hereby corrected as shown below:

Column 8, line 61, the claim reference numeral "11" should read --10--.

Signed and Sealed this

Third Day of July, 2007

JON W. DUDAS
*Director of the United States Patent and Trademark Office*